US008862130B2

(12) United States Patent
Wei et al.

(10) Patent No.: US 8,862,130 B2
(45) Date of Patent: Oct. 14, 2014

(54) METHOD AND SYSTEM FOR HANDOVER BASED ON RADIO RESOURCE ALLOCATION DATABASE

(75) Inventors: Min Wei, Shenzhen (CN); Nan Zhao, Shenzhen (CN); Feng Li, Shenzhen (CN); Aihua Peng, Shenzhen (CN); Senbao Guo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 304 days.

(21) Appl. No.: 13/581,621

(22) PCT Filed: Oct. 22, 2010

(86) PCT No.: PCT/CN2010/078038
§ 371 (c)(1),
(2), (4) Date: Aug. 29, 2012

(87) PCT Pub. No.: WO2011/147155
PCT Pub. Date: Dec. 1, 2011

(65) Prior Publication Data
US 2012/0322499 A1    Dec. 20, 2012

(30) Foreign Application Priority Data

May 25, 2010 (CN) .......................... 2010 1 0186613

(51) Int. Cl.
*H04W 36/00* (2009.01)
*H04W 36/24* (2009.01)
*H04W 36/36* (2009.01)
*H04W 72/04* (2009.01)

(52) U.S. Cl.
CPC .......... *H04W 36/24* (2013.01); *H04W 36/0005* (2013.01); *H04W 36/0044* (2013.01); *H04W 36/0016* (2013.01); *H04W 36/0083* (2013.01); *H04W 36/0088* (2013.01); *H04W 36/0094* (2013.01); *H04W 36/365* (2013.01); *H04W 72/04* (2013.01)
USPC ............ 455/436; 455/437; 455/442; 370/332

(58) Field of Classification Search
CPC ................... H04W 36/0005; H04W 36/0016; H04W 36/0083; H04W 36/0088; H04W 36/0044; H04W 36/0094; H04W 36/365
USPC ........ 455/434–444, 452.2, 135, 161.1, 161.3, 455/277.2, 456.2; 370/331–333; 375/E7.141
See application file for complete search history.

(56) References Cited

U.S. PATENT DOCUMENTS 5,175,867 A * 12/1992 Wejke et al. .................. 455/439
(Continued)

FOREIGN PATENT DOCUMENTS

CN          1810060 A       7/2006
(Continued)

OTHER PUBLICATIONS

International Search Report in international application No. PCT/CN2010/078038, mailed on Mar. 3, 2011.
(Continued)

*Primary Examiner* — Dominic E Rego
(74) *Attorney, Agent, or Firm* — Oppedahl Patent Law Firm LLC

(57) ABSTRACT

The disclosure discloses a method for handover based on a radio resource allocation database. The method includes that the radio resource allocation database is constructed and dynamically maintained; after receiving a handover request from a User Equipment (UE), a Base Station (BS) determines in the database a Radio Access Technology (RAT) and the corresponding carrier frequency resources suitable for a current communication condition of the UE for the UE according to a handover reason in the handover request, and notifies the UE of information regarding the determined RAT and information regarding the corresponding carrier frequency resource; and the UE performs QoS verification on the RAT and the corresponding carrier frequency resources notified by the BS, and switches to the corresponding carrier frequency with the RAT notified by the BS when the QoS on the RAT and the corresponding carrier frequency resources is superior to that of current communication. Meanwhile, the disclosure further discloses a system for handover based on a radio resource allocation database. The disclosure improves a resource usage rate and the QoS of a current communication system. The disclosure enables the UE to complete the handover quickly, such that user experience is improved.

16 Claims, 2 Drawing Sheets

(56) References Cited

U.S. PATENT DOCUMENTS

| | | | |
|---|---|---|---|
| 5,517,674 A * | 5/1996 | Rune | 455/437 |
| 6,606,496 B1 * | 8/2003 | Salvarani et al. | 455/436 |
| 6,819,927 B1 * | 11/2004 | Sato | 455/437 |
| 2005/0026615 A1 * | 2/2005 | Kim | 455/436 |
| 2008/0139204 A1 * | 6/2008 | Hsieh et al. | 455/436 |
| 2008/0253333 A1 * | 10/2008 | Hong et al. | 370/331 |
| 2009/0129341 A1 * | 5/2009 | Balasubramanian et al. | 370/331 |
| 2009/0180443 A1 * | 7/2009 | Kawasaki et al. | 370/331 |
| 2009/0191862 A1 * | 7/2009 | Amirijoo et al. | 455/424 |
| 2010/0003985 A1 * | 1/2010 | Jang et al. | 455/436 |
| 2010/0103817 A1 * | 4/2010 | Takayanagi et al. | 370/230 |
| 2010/0220687 A1 * | 9/2010 | Reznik et al. | 370/331 |
| 2011/0243094 A1 * | 10/2011 | Dayal et al. | 370/331 |

FOREIGN PATENT DOCUMENTS

| | | |
|---|---|---|
| CN | 101262693 A | 9/2008 |
| JP | 2004349976 A | 12/2004 |
| JP | 2008035563 A | 2/2008 |
| WO | 2005004516 A1 | 1/2005 |
| WO | 2008096702 A1 | 8/2008 |

OTHER PUBLICATIONS

English Translation of the Written Opinion of the International Search Authority in international application No. PCT/CN2010/078038, mailed on Mar. 3, 2011.

* cited by examiner

METHOD AND SYSTEM FOR HANDOVER BASED ON RADIO RESOURCE ALLOCATION DATABASE

TECHNICAL FIELD

The disclosure relates to a handover technology in a wireless communication system, and in particular to a method and a system for handover based on a radio resource allocation database.

BACKGROUND

With continuous development of wireless telecommunications, more and more users communicate by radio; the current wireless communication is not limited to voice communication, and wider data service communication is a direction of development of the wireless communication system, such as video, service or business data and the like. Along with the daily growing scale of the wireless communication, wireless spectrum resource is more remarkable in short supply. However, the current spectrum allocation system is generally a fixed allocation, that is, fixed spectrum resources are allocated to authorized users, which further increases the situation of the short supply of the spectrum resources. For example, the authorized users do not always occupy the allocated spectrums according to a large number of actual observed results around the world, that is, no matter which wireless access technology is utilized, a part of spectrums are always spare at a certain time within a certain space and frequency band. This provides the possibility for the effective utilization of these spare spectrum resources and for unauthorized users to provide paid service, so that the utilization ratio of the spectrum is increased and the pressure of the spectrum resources is reduced. The Cognitive Radio (CR) technology is developed based the above background.

In the current CR dynamic spectrum allocation technology, the purpose of an optimal dynamic spectrum allocation is achieved through utilizing an optimization algorithm including a neural network, a genetic algorithm, a simulated anneal algorithm or the like based on a method including game theory, tender, graph theory or the like. The above methods have the following shortages of large calculated amount, complex calculation, a lot of wasted device resources, and bad for the fast response of a device; in addition, the frequency bands available for wireless communication in the world are limited at present, and available Radio Access Technologies (RAT) are also limited, such that conclusions obtained by the above algorithms are not necessarily ensured to be actually available and a certain degree of approximation may need to be carried out, which counteracts the advancement of the algorithms to some extent. Another type of the allocation technology is that a Dynamic Spectrum Allocation (DSA) and Handover (HO) are carried out through utilizing the method of searching a database. The key points of the method are a construction of the database and a mechanism of searching the database. The database directly determines the effect of the DSA and the HO, thereby determining performance of a whole communication system.

In a wireless communication network, in particular a heterogeneous wireless communication network, an urgent problem to be solved is that how a CR network utilizes a database with the minimum cost to finish the allocation and the handover of dynamic spectrums.

SUMMARY

In view of the above problem, the main purpose of the disclosure is to provide a method and a system for handover based on a radio resource allocation database, which enables to select most suitable radio resource and a corresponding Radio Access Technology (RAT) for a User Equipment (UE) when a handover request is received and finish a handover at a higher speed.

To realize the above purpose, the technical solution of the disclosure is realized as follows.

A method for handover based on a radio resource allocation database is provides, wherein the radio resource allocation database is constructed and dynamically maintained, and the method includes that:

after receiving a handover request from a UE, a Base Station (BS) determines, in the database, a RAT and corresponding carrier frequency resources suitable for a current communication condition of the UE for the UE according to a handover reason in the handover request, and notifies the UE of information regarding the determined RAT and information regarding the corresponding carrier frequency resources; and the UE performs Quality of Service (QoS) verification on the RAT and the corresponding carrier frequency resources notified by the BS, and switches to the corresponding carrier frequency with the RAT notified by the BS when the QoS on the RAT and the corresponding carrier frequency resources is superior to that of current communication.

Preferably, the database may include at least UE information, spectrum information, spectrum idle time information, a spectrum affiliated BS and a communication strategy associated with a spectrum; the UE information may include service grade information of the UE and information regarding RATs supported by the UE; the spectrum information may include available spectrum resources of the BS and available spectrum resources of an adjacent BS; and the communication strategy associated with the spectrum may include communication fee requirement;

that the BS dynamically maintains the radio resource allocation database may include:

including but not limited to: users, spectrums, idle time, affiliated BS (including an operator and a network) information and related policies (including fee requirements); wherein the users includes important users and ordinary users, the important users are graded according to the degree of importance, and the ordinary users are graded according to a sequence of access application; the spectrums include but not limited to an unused carrier frequency, a corresponding RAT and QoS, the spectrums are graded according to the QoS, the corresponding RAT is a RAT possibly used on a carrier frequency, and the QoS is that: each communicating user measures a spectrum at a certain time interval and reports a BS through an uplink control channel regularly, and the BS determines the QoS, and makes a feasible tag if the QoS meets communication requirement; otherwise, does not make the tag; the idle time is graded according to the length of time not occupied by the spectrum; the sequencing of all grades are performed from the highest to the lowest; the related strategy refers to a strategy used by the affiliated BS and the spectrum, including fee information; and the process of dynamic allocation and handover is a process of dynamically searching the database, and the priority of the process of searching the database is arranged in order of the important users, the ordinary users, the idle time and the spectrum.

A maintenance period of the database is a broadcasting period of a current system or the database is triggered to be maintained by an event. A maintaining process of the database is a process of reordering in the priority according to interactive information. A result of the sequencing is that: the higher the priority is, the more front the rank is. In addition, the information with the top priority is arranged in the most front row of a queue.

The content of the database is numbered, such as 1 representing the users, 2 representing the spectrums, 3 representing the idle time, 4 representing the affiliated BS, and 5 representing the related strategy. Content marking each number may have sub content and is numbered sub number correspondingly; for example, the sub numbers of the spectrum includes: 21 representing an unavailable frequency point, 22 representing an unavailable frequency band (bandwidth), 23 representing a corresponding RAT, and 24 representing QoS. The numbering manners of content of other database are similar.

A UE in a communication state reports a QoS parameter of current service to a BS by utilizing a preset uplink channel, and the BS updates current spectrum resource information, selects spectrum resources applicable for the QoS parameter of the UE from the updated spectrum according to the QoS parameter reported by the UE, and sorts the selected spectrum resources according to an applicability priority.

Preferably, the method may further include that:

the BS receives from the UE after power on and stores information describing an attribute of the UE.

Preferably, the method may further include that:

when determining that the UE does not include the determined RAT, the BS transmits communication software for the determined RAT to the UE in notifying the UE of the selected RAT.

Preferably, the UE may pre-store the communication software for each RAT; and the method may further include that:

when determining that the UE does not include the selected RAT, the BS transmits identification information of the determined RAT to the UE in notifying the UE of the determined RAT.

A system for handover based on a radio resource allocation database is provided, which includes a UE and a BS, wherein the system further includes a constructing and maintaining unit, a determining unit, a notifying unit and a switching unit; wherein the constructing and maintaining unit is configured to construct and maintain the radio resource allocation database for each UE;

the determining unit is configured to, after receiving a handover request from the UE, determine in the database a RAT and corresponding carrier frequency resources suitable for a current communication condition of the UE for the UE according to a handover reason in the handover request;

the notifying unit is configured to notify the UE of information regarding the determined RAT and information regarding the corresponding carrier frequency resources; and the switching unit is configured to perform QoS verification on the RAT and the corresponding carrier frequency resource notified by the notifying unit, and switch to the corresponding carrier frequency according to the RAT notified by the BS when the QoS on the RAT and the corresponding carrier frequency resources is superior to that of current communication.

Preferably, the database may include at least UE information, spectrum information, spectrum idle time information, a spectrum affiliated BS and a communication strategy associated with a spectrum; the UE information may include service grade information of the UE and information regarding RATs supported by the UE; the spectrum information may include available spectrum resources of the BS and available spectrum resources of an adjacent BS; and the communication strategy associated with the spectrum may include communication fee requirement;

the constructing and maintaining unit may configured to, after further receiving a QoS parameter of current service that a UE in a communication state reports to a BS by utilizing a preset uplink channel, update current spectrum resource information, select spectrum resources available for the QoS parameter of the UE from the updated spectrum according to the QoS parameter reported by the UE, and sort the selected spectrum resources according to an applicability priority.

Preferably, the system may further include:

a receiving unit, configured to receive from the UE after power on and store information describing an attribute of the UE.

Preferably, the notifying unit may further configured to, when the determining unit further determines that the UE does not include the determined RAT, transmit the communication software for the determined RAT to the UE in notifying the UE of the selected RAT.

Preferably, the UE may pre-store the communication software for each RAT; and when the determining unit further determines that the UE does not include the determined RAT, the notifying unit may transmit identification information of the determined RAT to the UE in notifying the UE of the selected RAT.

Preferably, both the UE and the BS may support the CR technology;

the UE may report the QoS parameter of the current service and the information describing the attribute of the UE to the BS through a CR channel; and the notifying unit may notify the UE of the information regarding the determined RAT and the information regarding the corresponding carrier frequency resource through a CR channel, and transmit the communication software for the RAT or the identification information of the RAT to the UE through the CR channel.

In the disclosure, the radio resource allocation database is firstly constructed, that is, according to the current available carrier frequency resource information and the corresponding RAT, the current available radio resources are sorted after the QoS parameter of the business reported by the UE is received; the most suitable radio resource and the corresponding RAT are determined for the requesting UE, the corresponding resource information and the corresponding RAT are notified to the UE; after the handover request of the UE is received, the most front resources in the radio resource allocation database are allocated to the UE, and the UE performs the service handover according to the notified RAT and resource information. Therefore, the radio resource allocation data is maintained in advanced, so that the UE can quickly and exactly finish the handover, handover time can be shorten and user experience can be improved after the handover request of the UE is received.

DETAILED DESCRIPTION

The main idea of the disclosure is that: a radio resource allocation database is firstly constructed, that is, current available radio resources are sorted according to current available carrier frequency resource information and corresponding RAT after a QoS parameter of the business reported by a UE is received; the most suitable radio resources and the corresponding RAT are determined for the request UE, the corresponding resource information and the corresponding RAT are notified to the UE, the most front resources in the radio resource allocation database are allocated to the UE after a handover request of the UE is received, and the UE carries out a business handover according to the notified RAT and resource information.

The disclosure will be described in detail with reference to the accompanying drawings and embodiments hereinafter, in order to make the purpose, the technical solution and the advantages of the disclosure more clear.

Figure 1:
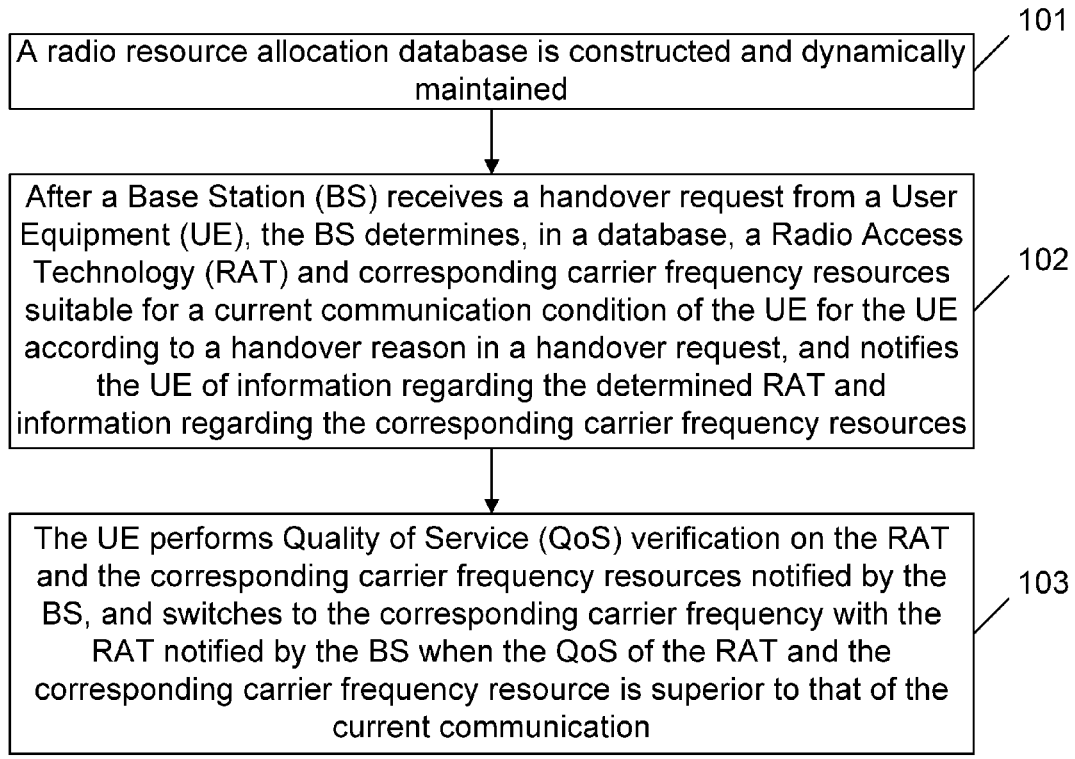
FIG. 1 shows a flowchart of a method for handover based on a radio resource allocation database according to the disclosure.

FIG. 1 shows a flowchart of a method for handover based on a radio resource allocation database according to the disclosure; as shown in FIG. 1, the method for handover based on a radio resource allocation database according to the disclosure specifically includes the following steps.

Step 101: a radio resource allocation database is constructed and dynamically maintained, wherein the database includes at least UE information, spectrum information, spectrum idle time information, a spectrum affiliated Base Station (BS) and a communication strategy associated with a spectrum.

The step 101 is the most basic and most important step of realizing the technical solution of the disclosure. In the disclosure, a radio resource allocation database is maintained on a BS side firstly and is configured to determine current available radio resource and a RAT corresponding to the radio resource for a UE. The radio resource allocation database of the disclosure is a dynamic database, that is, the database can be dynamically maintained according to related information reported by the UE. To some UE, in the maintained resource data, the available resources are sorted according to a QoS parameter of the business reported by the user, wherein the radio resource sorted at the first position and the corresponding RAT are the optimal resource information to be allocated to the UE, a BS allocates the radio resource at the first position in the corresponding data of the radio resource allocation database to the UE after receiving a handover request of the UE, and when determining that the UE does not include the allocated radio resource information, the BS further transmits a communication software for the RAT corresponding to the radio resource information to the UE, and the UE installs the communication software for the RAT and performs a handover by utilizing the allocated corresponding radio resource.

In the disclosure, the radio resource allocation database includes but not limited to the following information: users, spectrums, idle time, affiliated BS (including operators and network) information and related policies (including fee requirements). The users include important users and ordinary users, the important users are graded according to the degree of importance, and the ordinary users are graded according to the sequence of access application. The spectrums include unavailable frequency points, frequency bands (bandwidth), a corresponding RAT and QoS on the frequency points and frequency bands, and the like. The spectrums are graded according to the QoS on the business. For an Orthogonal Frequency Division Multiple Access (OFDMA) system, the QoS of the spectrums are graded to a sub carrier level; for other system, such as a Wideband Code Division Multiple Access (WCDMA) system, the QoS of the spectrums are graded to a bandwidth level. The QoS is reported by each communicating UE to the BS at a certain time interval through an uplink control channel of the UE regularly, and the BS determines the QoS and determines the current available spectrum, if the QoS meets the communication requirement, makes a feasible tag, otherwise, performs no processing. The corresponding RAT represents an available RAT in the carrier frequency. The QoS is obtained by that each communicating user measures the spectrums at a certain time interval and reports to the BS through the uplink control channel, and the BS determines the QoS, if the QoS meets the communication requirement, makes the feasible tag, otherwise, performs no processing. The idle time is graded according to the length of the time not occupied by the spectrum. The sequencing of all grades are performed from the highest to the lowest. The related strategy refers to a strategy used by the affiliated BS and the spectrums, including fee information. The process of the dynamic allocation and handover according to the disclosure is a process of dynamically searching the radio resource allocation database, the process of searching the radio resource allocation database is carried out according to the order of the UE, the idle time and the spectrum information, and is carried out according to the priority order when a specific search is carried out, for example, the resource is allocated to the UE according to the priority of the UE.

A maintenance period of the database is a broadcasting period of the current system or the database is triggered to be maintained by an event. A maintenance period of the database is a process of reordering according to the priority according to interactive information. A result of the sequencing is that: the higher the priority is, the more front the rank is. And the information with the top priority is arranged in the most front row of a queue.

In the disclosure, the content of the database can be numbered, such as 1 representing the users, 2 representing the spectrums, 3 representing the idle time, 4 representing the affiliated BS, and 5 representing the related strategy. Content marking each number can have sub content and is numbered sub number correspondingly; for example, the sub numbers of the spectrums includes: 21 representing an unavailable frequency point, 22 representing an unavailable frequency band (bandwidth), 23 representing a corresponding RAT, and 24 representing QoS. The numbering manners of content of other database are similar.

In the disclosure, the maintenance period of the radio resource allocation database can be the broadcasting period of the current system, or the database is triggered to be maintained by an event, for example, the corresponding maintenance is carried out after a related QoS parameter of the UE is received. The maintaining process of the radio resource allocation database is a process of reordering in the priority according to interactive information. The result of the sequencing is that: the higher the priority is, the more front the rank is. And the information with the top priority is arranged in the most front row of the queue.

Figure 3:
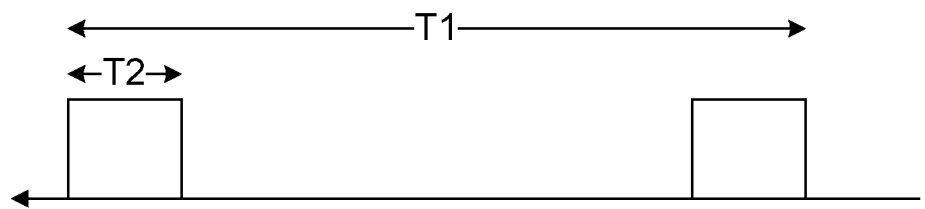
FIG. 3 shows a schematic diagram of maintenance of the resource database according to the disclosure.

FIG. 3 shows a schematic diagram of maintenance of a radio resource database. A T1 represents a maintenance period of the resource database and is a broadcasting period of a current communication system. Because the broadcasting periods of the multiple communication systems are different, a BS of the current communication system continuously receives information of other BS and user within the T1 period and maintains the database within a T2 time segment in the next T1 period according to the information. And the T2 represents the time of maintaining the resource database.

Specifically, for a UE, information of the radio resource most suitable for the radio resource and the corresponding RAT is arranged in the front rank of the corresponding data in the radio resource allocation database; and when determining the radio resource for the UE, a BS directly selects the radio resource information in the most front rank of the data corresponding to the UE. In the disclosure, the radio resource most suitable for the UE refers to the radio resource which can meet the QoS requirement of the business of the UE and does not cause waste of the radio resource; moreover, the factor of communication fee needs to be considered, besides the factor whether the radio resource can meet the condition of the QoS, that is, the communication fee corresponding to the allocated radio resource is lower than the communication fee selected by the UE for the current service. Here, the fee factor is a relatively secondary factor.

In the disclosure, the UE is divided into a Multi-Radio (MR) UE, a Cognitive Radio (CR) UE and a mono-mode UE according to the property of the UE, wherein the MR UE is a UE supporting multiple RATs, and the mono-mode UE is a UE only supporting one RAT.

Step 102: after the BS receives a handover request from the UE, the BS determines, in a database, the RAT and corresponding carrier frequency resources suitable for a current communication condition of the UE for the UE according to a handover reason in the handover request, and notifies the UE of information regarding the determined RAT and information regarding the corresponding carrier frequency resources.

In the step, the BS performs relative resource allocation according to the radio resource allocation database maintained for the UE after receiving the handover request of the UE. Specifically, the handover request of the UE can be a handover request for better QoS by the user due to some service requirement, such as service traffic requirement change because of needing video transmission, or due to the change of the QoS, such as that the current QoS becomes poorer. According to the requirement of the user, the BS extracts the optimal radio access information meeting the requirement from the radio resource allocation database, and notifies the user through a cognitive pilot channel.

In the disclosure, the usage of the radio resource allocation data for the BS is divided into two stages. The first stage is an electrified stage of a cognitive user, the user accesses a communication system according to information (probably a cognitive pilot channel) provided on a special channel during electrifying, and describes its own attribute, i.e., a mono-mode UE, a MR UE or a CR UE. The information provided on the channel includes the optimal radio access information extracted from the radio resource allocation database, i.e., the radio access information arranged in the most front rank. The second stage is a normal communication stage of the user. The user makes an apply due to some service requirement, such as service traffic requirement change because of needing video transmission, or due to change of the QoS, such as that the current service quality becomes poorer. According to the requirement of the user, the BS extracts the optimal radio access information meeting the requirement from the database and transmits to the UE through the cognitive pilot channel. When the UE is the MR UE, the BS can only transmit the number of the selected RAT (identification information or other information); when the UE is the CR UE, the optimal radio access information transmitted by the BS can include a new RAT communication software; and when the UE is the mono-mode user, the BS extracts the corresponding parameter from the optimal radio access information and transmits the parameter to the user, i.e., only transmitting the parameter needed for performance regulation to the user.

Those skilled in the art should understand that the determination of the corresponding RAT according to the current radio resource is easy to be realized, and the step that the BS notifies the UE of the related radio resource information and the RAT information through the corresponding cognitive channel is easy to be realized. After the BS determines the type of the UE according to the attribute information reported by the UE, the BS notifies the UE of the identification information regarding the RAT or the determined RAT communication software; or, when the BS determines that the UE is the mono-mode UE, the BS notifies the mono-mode UE of the set configuration parameter information of the UE; at the moment, the BS notifies the mono-mode UE through an ordinary radio channel if the UE is the mono-mode UE.

Step 103: the UE performs QoS verification on the RAT and the corresponding carrier frequency resource notified by the BS, and the UE switches to the corresponding carrier frequency by utilizing the RAT notified by the BS when the QoS is superior to the QoS on the current communication.

In the step, after the UE receives notification information of a BS side, the UE starts the RAT and switches with the BS side by using the allocated radio resource to continue the current communication service according to the radio resource information and the corresponding RAT determined by the BS. When the UE is the CR UE and the CR UE does not have the RAT determined by the BS, the BS transmits the RAT communication software to the CR UE, and the CR UE installs the RAT communication software and performs the handover according to the radio resource allocated by the BS. When the UE is the mono-mode UE, the BS allocates the related handover parameter for the UE according to the handover request and notifies the mono-mode UE, and the mono-mode UE performs the corresponding handover according to the related configuration parameter.

In the disclosure, after the UE receives the radio resource information and the corresponding RAT transmitted by the BS, the UE can compare the current QoS with the allocated radio resource and the RAT; if the QoS on the allocated radio resource and the RAT is not higher than the current QoS and the fee is further not preferential, the UE refuses to switch on the current radio resource; and if the QoS of the allocated radio resource and the RAT is equal to the current communication service quality and the fee is further lower, the UE can perform the handover. Specifically, the strategy determining the handover can be set according to the actual requirement of the user.

Those skilled in the art should understand that performing the handover according to the current radio resource and the appointed RAT is easy to be realized.

The RAT of the disclosure includes but not limited to a Global System for Mobile Communication (GSM) network technology, a Universal Mobile Telecommunications System (UMTS) network technology, a Long Term Evolution (LTE) network technology and the like.

Figure 2:
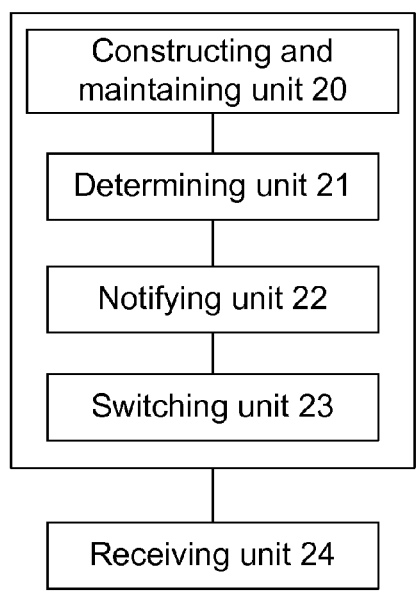
FIG. 2 shows a structural diagram of a system for handover based on a radio resource allocation database according to the disclosure.

A system for handover based on a radio resource allocation database according to the disclosure includes a UE and a BS, which are specifically same as the connection and the function of an existing communication system. FIG. 2 shows a structural diagram of the system for handover based on a radio resource allocation database according to the disclosure. As shown in FIG. 2, the system further includes a constructing and maintaining unit 20, a determining unit 21, a notifying unit 22 and a switching unit 23; wherein the constructing and maintaining unit 20 is configured to construct and dynamically maintain a radio resource allocation database for each UE, wherein the database includes at least UE information, spectrum information, spectrum idle time information, a spectrum affiliated BS and a communication strategy associated with a spectrum;

the determining unit 21 is configured to, after receiving a handover request of the UE, determine in the database a RAT and corresponding carrier frequency resources suitable for a current communication condition of the UE for the UE according to a handover reason of a handover request;

the notifying unit 22 is configured to notify the UE of information regarding the determined RAT and information regarding the corresponding carrier frequency resource; and the switching unit 23 is configured to perform QoS verification on the RAT and the corresponding carrier frequency resources notified by the notifying unit, and switch to the corresponding carrier frequency according to the RAT notified by the BS when the QoS is superior to the QoS on current communication.

The UE information includes service grade information of the UE and information regarding RATs supported by the UE; the spectrum information includes available spectrum resource of the BS and available spectrum resource of an adjacent BS; and the communication policy associated with the spectrum includes communication fee requirement;

the constructing and maintaining unit is further configured to, after receiving a QoS parameter of current service that a UE in a communication state reports to a BS by utilizing a preset uplink channel, update current spectrum resource information select spectrum resource applicable for the QoS parameter of the UE from the updated spectrum according to the QoS parameter reported by the UE, and sort the selected spectrum resources according to an applicability priority.

FIG. 3 shows a schematic diagram of maintenance of a radio resource database. A T1 represents a maintenance period of a resource database and is a broadcasting period of a current communication system. Because the broadcasting periods of the multiple communication systems are different, the BS of the current communication system continuously receives information of other BS and user within the T1 period and maintains the database within a T2 time segment in the next T1 period according to the information. And the T2 represents the time of maintaining the resource database.

As shown in FIG. 2, the system for the handover based on the radio resource allocation database according to the disclosure further includes: a receiving unit 24, configured to receive from the UE after power on and store information describing an attribute of the UE.

When the determining unit 21 further determines that the UE does not include the determined RAT, the notifying unit 22 further transmits the communication software for the determined RAT to the UE when notifying the UE of the selected RAT.

The UE pre-stores the communication software for each RAT and when the determining unit 21 further determines that the UE does not include the determined RAT, the notifying unit 22 transmits identification information of the determined RAT to the UE when notifying the UE the selected RAT.

The UE and the BS both support the CR technology;

the UE reports the QoS parameter of the current service and the information describing the attribute of the UE to the BS through a cognitive radio channel; and the notifying unit notifies the UE of the information regarding the determined RAT and the information regarding the corresponding carrier frequency resource through the cognitive radio channel, and transmits the communication software for the RAT or the identification information of the RAT to the UE through the cognitive radio channel.

Those skilled in the art should understand that the system for handover based on a radio resource allocation database shown in FIG. 2 is designed for realizing the above method for handover based on a radio resource allocation database, and the implementation function of each processing unit in FIG. 2 can be understood through referring to the corresponding description of the above method. The function of each processing unit in the system shown in FIG. 2 can be realized through a program running on a processor and can be further realized through a specific logic circuit.

The above are only the preferred embodiments of the disclosure and are not intended to limit the scope of protection of the disclosure.

The invention claimed is:

1. A method for handover based on a radio resource allocation database, wherein the radio resource allocation database is constructed and dynamically maintained, and the method comprises:

after receiving a handover request from a User Equipment (UE), determining in the database, by a Base Station (BS), a Radio Access Technology (RAT) and corresponding carrier frequency resources suitable for a current communication condition of the UE for the UE according to a handover reason in the handover request, and notifying the UE of information regarding the determined RAT and information regarding the corresponding carrier frequency resources; and performing, by the UE, Quality of Service (QoS) verification on the RAT and the corresponding carrier frequency resources notified by the BS, and switching to the corresponding carrier frequency with the RAT notified by the BS when the QoS on the RAT and the corresponding carrier frequency resources is superior to that of current communication.

2. The method according to claim 1, wherein the database comprises at least UE information, spectrum information, spectrum idle time information, a spectrum affiliated BS and a communication strategy associated with a spectrum; the UE information comprises service grade information of the UE, and information regarding RATs supported by the UE; the spectrum information comprises available spectrum resources of the BS and available spectrum resources of an adjacent BS; and the communication strategy associated with the spectrum comprises communication fee requirements.

3. The method according to claim 2, wherein the dynamically maintaining of the radio resource allocation database by the BS comprises:

reporting, by a UE in a communication state, a QoS parameter of current service to a BS by utilizing a preset uplink channel, and updating, by the BS, current spectrum resource information, selecting from the updated spectrum, by the BS, spectrum resources applicable for the QoS parameter of the UE according to the QoS parameter reported by the UE, and sorting the selected spectrum resources according to an applicability priority.

4. The method according to claim 1, further comprising:

receiving from the UE after power on and storing, by the BS, information describing an attribute of the UE.

5. The method according to claim 4, wherein the method further comprises:

when determining that the UE does not include the determined RAT, transmitting, by the BS, communication software for the determined RAT to the UE in notifying the UE of the selected RAT.

6. The method according to claim 5, wherein both the UE and the BS support a Cognitive Radio (CR) technology;

the UE reports the QoS parameter and the information describing the attribute of the UE to the BS through a CR channel; and the BS notifies the UE of the information regarding the determined RAT and the information regarding the corresponding carrier frequency resources through a CR channel, and transmits the communication software for the RAT or the identification information of the RAT to the UE through the CR channel.

7. The method according to claim 4, wherein the UE pre-stores communication software for each RAT; and the method further comprises:

when determining that the UE does not include the selected RAT, transmitting, by the BS, identification information of the determined RAT to the UE in notifying the UE of the determined RAT.

8. The method according to claim 7, wherein both the UE and the BS support a Cognitive Radio (CR) technology;

the UE reports the QoS parameter and the information describing the attribute of the UE to the BS through a CR channel; and the BS notifies the UE of the information regarding the determined RAT and the information regarding the corresponding carrier frequency resources through a CR channel, and transmits the communication software for the RAT or the identification information of the RAT to the UE through the CR channel.

9. A system for handover based on a radio resource allocation database, comprising a UE and a BS, wherein the system further comprises a constructing and maintaining unit, a determining unit, a notifying unit and a switching unit; wherein the constructing and maintaining unit is configured to construct and maintain the radio resource allocation database for each UE;

the determining unit is configured to, after receiving a handover request from the UE, determine in the database a RAT and corresponding carrier frequency resources suitable for a current communication condition of the UE for the UE according to a handover reason in the handover request;

the notifying unit is configured to notify the UE of information regarding the determined RAT and information regarding the corresponding carrier frequency resources; and the switching unit is configured to perform QoS verification on the RAT and the corresponding carrier frequency resource notified by the notifying unit, and switch to the corresponding carrier frequency according to the RAT notified by the BS when the QoS on the RAT and the corresponding carrier frequency resources is superior to that of current communication.

10. The system according to claim 9, wherein the database comprises at least UE information, spectrum information, spectrum idle time information, a spectrum affiliated BS and a communication strategy associated with a spectrum; the UE information comprises service grade information of the UE and information regarding RATs supported by the UE; the spectrum information comprises available spectrum resources of the BS and available spectrum resources of an adjacent BS; and the communication strategy associated with the spectrum comprises communication fee requirement.

11. The system according to claim 10, wherein after further receiving a QoS parameter of current service that a UE in a communication state reports to a BS by utilizing a preset uplink channel, the constructing and maintaining unit updates current spectrum resource information, selects spectrum resources available for the QoS parameter of the UE from the updated spectrum according to the QoS parameter reported by the UE, and sorts the selected spectrum resources according to an applicability priority.

12. The system according to claim 9, wherein the system further comprises:

a receiving unit, configured to receive from the UE after power on and store information describing an attribute of the UE.

13. The system according to claim 12, wherein when the determining unit further determines that the UE does not include the determined RAT, the notifying unit further transmit the communication software for the determined RAT to the UE in notifying the UE of the selected RAT.

14. The system according to claim 13, wherein both the UE and the BS both support the CR technology;

the UE reports the QoS parameter of the current service and the information describing the attribute of the UE to the BS through a CR channel; and the notifying unit notifies the UE of the information regarding the determined RAT and the information regarding the corresponding carrier frequency resource through a CR channel and transmits the communication software for the RAT or the identification information of the RAT to the UE through the CR channel.

15. The system according to claim 12, wherein the UE pre-stores the communication software for each RAT; and when the determining unit further determines that the UE does not include the determined RAT, the notifying unit transmits identification information of the determined RAT to the UE in notifying the UE of the selected RAT.

16. The system according to claim 15, wherein both the UE and the BS both support the CR technology;

the UE reports the QoS parameter of the current service and the information describing the attribute of the UE to the BS through a CR channel; and the notifying unit notifies the UE of the information regarding the determined RAT and the information regarding the corresponding carrier frequency resource through a CR channel and transmits the communication software for the RAT or the identification information of the RAT to the UE through the CR channel.

* * * * *